Figure 1:
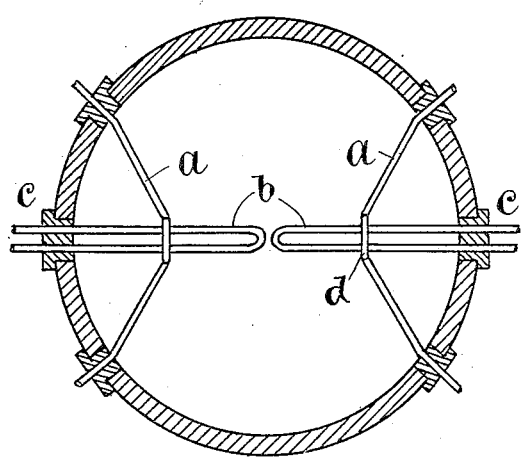

C. O. A. DÖVLE.
ELECTRIC ARC FURNACE.
APPLICATION FILED JAN. 10, 1914.

1,204,349.

Patented Nov. 7, 1916.

UNITED STATES PATENT OFFICE.

CARL OLAF ANDERSEN DÒVLE, OF NOTODDEN, NORWAY, ASSIGNOR TO NORSK HYDRO-ELEKTRISK KVAELSTOFAKTIESELSKAB, OF CHRISTIANIA, NORWAY.

ELECTRIC-ARC FURNACE.

1,204,349.   Specification of Letters Patent.   Patented Nov. 7, 1916.

Application filed January 10, 1914. Serial No. 811,420.

*To all whom it may concern:*

Be it known that I, CARL OLAF ANDERSEN DÒVLE, a subject of the King of Norway, residing at Notodden, Norway, have invented certain new and useful Improvements in Electric-Arc Furnaces; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to improvements in the electrode arrangement for electric arc furnaces of the Birkeland and Eyde type, that is to say, in which a long portion of the electrode is exposed in the furnace to permit the spread or dispersed arc to travel along the electrode, between its free end and the furnace wall, for a considerable length. Such electrodes, as distinguished from electrodes of other types of furnaces, are subjected to vibration.

In the operation of electric arc furnaces with arcs moving along the electrodes certain irregularities in the operation and consequent loss of efficiency have proved to be due to the fact that the electrodes are subject to vibrations. Said vibrations are not sufficiently eliminated by the use of the well-known type of electrodes formed of rods on tubes bent in U-form, which besides other advantages also has the one that a considerable rigidity is obtained with the use of a minimum of material.

Now the present invention has for its object to provide the electrodes with special bracings which have the effect that said vibrations are entirely or almost entirely avoided and that the furnaces in consequence thereof may be operated with greater efficiency. Said bracings may be so arranged as to prevent vibration only in vertical or only in lateral direction or they may be arranged to prevent vibration in any direction.

In the drawing some forms for carrying out the invention are shown.

Figure 2:
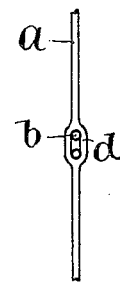
Figure 3:
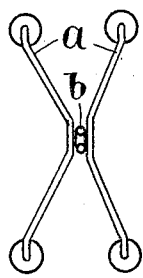
Figure 4:
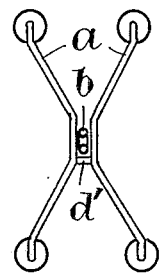

Figure 1 is a side view of a couple of electrodes with their bracings. Fig. 2 is an end view of one of the bracings. Figs. 3 and 4 show end views of other forms of bracings.

According to Figs. 1 and 2 braces $a$ are used, which may be formed of tubes for the purpose of cooling them by a current of water. These braces are fastened in the furnace at a suitable distance from the boxes $c$ through which the electrodes $b$ pass into the furnace, and are formed with an eye or slot $d$ serving as a holder or guide for the electrode. Braces of this construction chiefly steady the electrodes in a vertical direction, or in the plane of the flame.

Fig. 3 illustrates a method of bracing, which has for its object to increase the stability in the horizontal direction, while at the same time it does not prevent the flame arc from being drawn out along the electrodes past the point where these touch the braces. Of course both ways of bracing may be combined, for instance, as shown in Fig. 4 in which a connecting piece $d'$ is arranged between the braces close under the electrode.

The braces may be fixed to the furnace wall in any convenient and well known manner, allowing the necessary adjustment, so that the electrodes are brought in alinement with each other by adjusting the braces.

I claim:

1. In an electric arc furnace, the combination with electrodes thereof in which the arc moves along the electrodes and said electrodes are subjected to the vibratory action of the arc; of means inside the furnace to prevent vibrations of the electrodes.

2. In an electric arc furnace, the combination with an electrode thereof in which the arc moves along the electrode and has a vibratory action thereon; of steadying means for the electrode, supported by the furnace walls at a distance from the point where the electrode enters the furnace.

3. In an electric arc furnace, the combination with an electrode thereof in which the arc moves along the electrode and has a vibrating action thereon; of adjustable steadying means for the electrode, supported by the furnace walls at a distance from the point where the electrode enters the furnace.

4. In an electric arc furnace, the combination with an electrode thereof in which the arc moves along the electrode and has a vibrating action thereon; of adjustable water-cooled steadying means for the electrode, supported by the furnace walls at a distance from the point where the electrode enters the furnace.

5. The combination with a U-shaped electric furnace electrode along which the arc moves and has vibratory action thereon; of a metallic brace extending from the furnace wall to the electrode intermediate its end and the point where the electrode enters the furnace, the ends of said brace extending through the furnace wall to the outside thereof.

6. The combination with the electrode of an electric furnace in which the arc moves along the electrode and has a vibratory action thereon; of a brace on each side of the electrode extending through the furnace walls at a distance from the point where the electrode enters the furnace.

7. The combination with the electrode of an electric furnace in which the arc moves along the electrode; of an adjustable brace on each side of the electrode extending through the furnace walls at a distance from the point where the electrode enters the furnace.

8. The combination with the electrode of an electric furnace in which the arc moves along the electrode; of an adjustable hollow brace on each side of the electrode extending through the furnace walls at a distance from the point where the electrode enters the furnace.

9. The combination with the electrode of an electric furnace in which the arc moves along the electrode; of a brace on each side of the electrode extending through the furnace walls at a distance from the point where the electrode enters the furnace, and connecting means between the braces adjacent the electrode.

10. The combination with the electrode of an electric furnace in which the arc moves along the electrode; of an adjustable brace on each side of the electrode extending through the furnace walls at a distance from the point where the electrode enters the furnace, and connecting means between the braces adjacent the electrode.

11. The combination with the electrode of an electric furnace in which the arc moves along the electrode; of an adjustable hollow brace on each side of the electrode extending through the furnace walls at a distance from the point where the electrode enters the furnace, and connecting means between the braces at the electrode.

In testimony that I claim the foregoing as my invention, I have signed my name in presence of two subscribing witnesses.

CARL OLAF ANDERSEN DÖVLE.

Witnesses:
RUTH LINDSTRÖM,
KR. SAHLGANED.

Copies of this patent may be obtained for five cents each, by addressing the "Commissioner of Patents, Washington, D. C."